United States Patent
Bacon et al.

(10) Patent No.: US 8,782,104 B2
(45) Date of Patent: Jul. 15, 2014

(54) PROCESSING CHANGES TO REFERENCE COUNTS ASSOCIATED WITH AN OBJECT IN REFERENCE COUNTING SYSTEMS

(75) Inventors: David Francis Bacon, New York, NY (US); Vadakkedathu Thomas Rajan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/363,811

(22) Filed: Feb. 1, 2012

(65) Prior Publication Data

US 2012/0131070 A1 May 24, 2012

Related U.S. Application Data

(60) Division of application No. 12/129,110, filed on May 29, 2008, now Pat. No. 8,126,940, which is a continuation of application No. 11/695,323, filed on Apr. 2, 2007, now abandoned, which is a continuation of application No. 10/013,148, filed on Dec. 10, 2001, now Pat. No. 7,216,136.

(60) Provisional application No. 60/254,615, filed on Dec. 11, 2000, provisional application No. 60/254,691, filed on Dec. 11, 2000.

(51) Int. Cl.
*G06F 17/30* (2006.01)

(52) U.S. Cl.
USPC .......................................................... 707/814

(58) Field of Classification Search
USPC ......... 707/813, 814, 815, 818, 812, 816, 820, 707/999.206
See application file for complete search history.

(56) References Cited

U.S. PATENT DOCUMENTS

| | | | |
|---|---|---|---|
| 4,775,932 A * | 10/1988 | Oxley et al. | 1/1 |
| 5,241,673 A | 8/1993 | Schelvis | 707/103 R |
| 5,873,105 A | 2/1999 | Tremblay et al. | 707/206 |
| 6,052,699 A * | 4/2000 | Huelsbergen et al. | 1/1 |
| 6,339,779 B1 | 1/2002 | Houldsworth | 707/206 |
| 6,363,403 B1 * | 3/2002 | Roy et al. | 1/1 |
| 6,393,440 B1 | 5/2002 | Salant et al. | 707/206 |
| 6,434,577 B1 * | 8/2002 | Garthwaite | 1/1 |
| 6,473,773 B1 | 10/2002 | Cheng et al. | 707/200 |
| 6,704,756 B2 | 3/2004 | Wollrath et al. | 707/206 |
| 6,760,736 B2 | 7/2004 | Waldo et al. | 707/206 |

OTHER PUBLICATIONS

Jones et al., "Garbage Collection Algorithms for Automatic Dynamic Memory Management," John Wiley and Sons, Chapter 2, pp. 19-41 (1996).

(Continued)

*Primary Examiner* — Greta Robinson
(74) *Attorney, Agent, or Firm* — Ryan, Mason & Lewis, LLP

(57) ABSTRACT

The present invention provides techniques that allow concurrent collection of cyclic garbage on reference counting systems. In general, candidate objects are found that may be part of cyclic garbage. Each candidate object has a reference count. Two tests are performed to determine if concurrent operations have affected the reference counts of the candidate objects. If concurrent operations have not affected the reference counts, the candidate objects are collected as garbage. Additionally, during garbage collection, the decrements to reference counts are delayed so that increments occur before decrements and so that decrements are held a predetermined time before being applied. This prevents decrementing a reference and collecting a cycle as garbage right before a reference is added to an object in the cycle.

19 Claims, 12 Drawing Sheets

(56) References Cited

OTHER PUBLICATIONS

Jones et al., "Garbage Collection," John Wiley and Sons, ch. 3 (1996).
Jones et al., "Garbage Collection Algorithms for Automatic Dynamic Memory Management," John Wiley and Sons. Chapter 2, pp. 19-41 (1996).
Ye et al., "Collecting Cyclic Garbage in Distributed Systems," Parallel Architectures, Algorithms, and Networks, IEEE Proceed Third International Symposium, pp. 227-231, (1997).
Gupta et al., "Reliable Garbage Collection in Distributed Object Oriented Systems," IEEE Computer Software and Applications Conference, COMPSA 88 Proceedings, 12th Int'l, pp. 324-328 (1988).

* cited by examiner

```
Increment(S)
  RC(S) = RC(S) + 1
  ScanBlack(S)

Decrement(S)
  RC(S) = RC(S) - 1
  if (RC(S) == 0)
    Release(S)
  else
    PossibleRoot(S)

Release(S)
  for T in children(S)
    Decrement(T)
  color(S) = black
  if (! buffered(S))
    Free(S)

PossibleRoot(S)
  ScanBlack(S)
  color(S) = purple
  if (! buffered(S))
    buffered(S) = true
    append S to Roots ProcessCycles()
  FreeCycles()
  CollectCycles()
  SigmaPreparation()

CollectCycles()
  MarkRoots()
  ScanRoots()
  CollectRoots()

MarkRoots()
  for S in Roots
    if (color(S) == purple
        and RC(S) > 0)
      MarkGray(S)
    else
      remove S from Roots
      buffered(S) = false
      if (RC(S) == 0)
        Free(S)

ScanRoots()
  for S in Roots
    Scan(S)

CollectRoots()
  for S in Roots
    if (color(S) == white)
      CurrentCycle = empty
      CollectWhite(S)
      append CurrentCycle
        to CycleBuffer
    else
      buffered(S) = false
    remove S from Roots MarkGray(S)
  if (color(S) != gray)
    color(S) = gray
    CRC(S) = RC(S)
    for T in children(S)
      MarkGray(T)
  else if (CRC(S) > 0)
    CRC(S) = CRC(S) - 1

Scan(S)
  if (color(S) == gray
      and CRC(S) == 0)
    color(S) = white
    for T in children(S)
      Scan(T)
  else
    ScanBlack(S)

ScanBlack(S)
  if (color(S) != black)
    color(S) = black
    for T in children(S)
      ScanBlack(T)

CollectWhite(S)
  if (color(S) == white)
    color(S) = orange
    buffered(S) = true
    append S to CurrentCycle
    for T in children(S)
      CollectWhite(T)
```

FIG. 8

```
SigmaPreparation()                      Refurbish(C)
  for C in CycleBuffer                    first = true
    for N in C                            for N in C
      color(N) = red                        if ((first and
      CRC(N) = RC(N)                            color(N)==orange) or
    for N in C                                color(N)==purple)
      for M in children(N)                  color(N) = purple
        if (color(M) == red                 append N to Roots
            and CRC(M) > 0)               else
          CRC(M) = CRC(M)-1                 color(N) = black
    for N in C                              buffered(N) = false
      color(N) = orange                   first = false FreeCycles()                            FreeCycle(C)
  last = |CycleBuffer|-1                  for N in C
  for i = last to 0 by -1                   color(N) = red
    C = CycleBuffer[i]                    for N in C
    if (DeltaTest(C)                        for M in children(N)
        and SigmaTest(C))                     CyclicDecrement(M)
      FreeCycle(C)                        for N in C
    else                                    Free(N)
      Refurbish(C)
  clear CycleBuffer                     CyclicDecrement(M)
                                          if (color(M) != red)
DeltaTest(C)                                if (color(M) == orange)
  for N in C                                  RC(M) = RC(M) - 1
    if (color(N) != orange)                   CRC(M) = CRC(M) - 1
      return false                          else
  return true                                 Decrement(M)

SigmaTest(C)
  externRC = 0
  for N in C
    externRC = externRC+CRC(N)
  return (externRC == 0)
```

FIG. 9

PROCESSING CHANGES TO REFERENCE COUNTS ASSOCIATED WITH AN OBJECT IN REFERENCE COUNTING SYSTEMS

CROSS REFERENCE TO RELATED APPLICATIONS

This application is a divisional of U.S. patent application Ser. No. 12/129,110, filed May 29, 2008, now U.S. Pat. No. 8,126,940, which is a continuation of U.S. patent application Ser. No. 11/695,323, filed Apr. 2, 2007, now abandoned, which is a continuation of U.S. patent application Ser. No. 10/013,148, filed Dec. 10, 2001, now U.S. Pat. No. 7,216,136, which claims the benefit of U.S. Provisional Application No. 60/254,615, filed Dec. 11, 2000, and U.S. Provisional Patent Application No. 60/254,691, filed Dec. 11, 2000, each incorporated by reference herein.

FIELD OF THE INVENTION

The present invention relates to garbage collection in computer systems and, more particularly, relates to concurrent collection of cyclic garbage in reference counting systems.

BACKGROUND OF THE INVENTION

The term "garbage" is used to describe an object or data element that is no longer accessible by a computer program. Some systems are designed with no garbage detection and collection programs. In these systems, it is up to the programmer to remember to reclaim objects and data that is no longer accessible. Garbage occupies part of the memory of a computer system but serves no purpose. If a computer program does not run for very long or is infrequently run, garbage collection is not a problem because the computer system generally has plenty of memory. However, if the program creates garbage and is run for a long time or frequently, the extraneous garbage can grow to occupy all of the useful memory of the computer system. This will cause a system shutdown or other deleterious effects. Today, programs are designed to run continuously all day, every day. Business servers simply cannot experience unscheduled shutdowns.

The effect of garbage has been known from the beginning of the computer era. In fact, forty years ago, two methods of automatic garbage collection for computer systems were introduced: reference counting and tracing. Reference counting is described in Collins, "A Method for Overlapping and Erasure of Lists," Communications of the Ass'n of Computing Machinery (ACM) 3, 655-657 (1960), while tracing is described in McCarthy, "Recursive Functions of Symbolic Expressions and Their Computation by Machine," Communications of ACM 3, 184-195 (1960), the disclosures of which are incorporated herein by reference. Briefly, in reference counting, a reference count is used in an object to track how many other objects reference this object. Reference counts are incremented and decremented, and a reference count of zero indicates that the object is garbage because it is unreachable by any other object. In tracing, the entire object graph is traced until garbage is found. Since this early time, tracing collectors and their variants have been much more widely used due to perceived deficiencies in reference counting.

Changes in the relative costs of memory and processing power, and the widespread adoption of languages that employ garbage collection, have modified the landscape. As processor clock speeds increase while Random Access Memory (RAM) becomes plentiful but not significantly faster, certain properties of reference counting make it more appealing. Moreover, the purported extra processing power required is likely to be less relevant.

At the same time, the incorporation of garbage collection by the programming language Java has thrust the problem into the mainstream. Now, large, mission-critical systems are being built in Java. This stresses the flexibility and scalability of the underlying garbage collection implementations used in Java. As a result, the supposed advantages of tracing collectors, namely simplicity and low overhead, are being eroded as they are being made ever more complex in an attempt to address the real-world requirements of large and varied programs.

Furthermore, the fundamental assumption behind tracing collectors, namely that it is acceptable to periodically trace all of the live objects in the heap (an area of memory reserved for data that is created during runtime), will not necessarily scale to the very large main memories that are becoming increasingly common.

There are three primary problems with reference counting: (1) the storage overhead associated with keeping a count for each object; (2) the runtime overhead of incrementing and decrementing the reference count each time a pointer is copied; and (3) the inability to detect cyclic garbage and consequent necessity of including a second garbage collection technique to deal with cyclic garbage.

The inability to collect cyclic garbage (also called "cycles" herein generally considered to be the greatest weakness of reference counting collectors. It places the burden on the programmer to break cycles explicitly, requires special programming idioms, or requires a tracing collector to collect the cycles.

The problem of cycles in reference counting systems is illustrated in FIGS. 1 and 2. FIG. 1 shows a subgraph 100 containing a number of nodes 110, 125, 130, 135, 140, 145, 150, and 155 therein. When a computer program runs, it creates a number of objects or data structures or both. The interrelationship between the program, the objects, and the data structures is commonly called a graph. FIG. 1 shows a subset of a graph created by an executing program (the program is not shown). This subset is subgraph 100.

Subgraph 100, as discussed above, contains a number of nodes 110, 125, 130, 135, 140, 145, 150, and 155. Each node represents an object or part of a data structure. Between each node is one or more edges. For instance, between node 110 and node 125 is edge 115, and between node 110 and node 140 is edge 120. Additionally, node 110 is connected to the rest of the graph (not shown) through edge 105. Each edge represents a reference from one node to another node. In FIG. 1, node 110 is referencing node 125 through edge 115, and it is also referencing node 140 through edge 120.

In a reference counting system, the reference count for each node is tracked. For instance, node 125 has a Reference Count (RC) of two because nodes 110 and 135 reference node 125. In FIG. 1, subgraph 160 represents a cyclic structure, while subgraph 170 represents an acyclic structure. Subgraph 160 represents a cyclic structure because there is a series of edges that traverses nodes and that starts at node 125 and ends at 125. In other words, one can traverse this graph by starting at one node and ending at the same node. Thus, subgraph 160 is cyclic. In subgraph 170, conversely, there is no series of edges that traverses nodes and that starts at one node and ends at the same node. Thus, subgraph 170 is acyclic.

FIG. 2 shows a resultant subgraph 200 that occurs after the program removes the references from node 110 that created edges 115 and 120. Even though the program explicitly removes the references, a "mutator" actually performs the low level removal of references. The process undertaken by the mutator is generally hidden from a programmer. A garbage collector will easily recognize that subgraph 170 is garbage, because the reference count for node 140 is zero. A zero indicates that node 140 is no longer being referenced by the program, and, therefore, the node may be removed. Because node 140 can be removed, nodes 145, 150, and 155 can also be removed.

Subgraph 160 is more challenging for a garbage collector. There is no node that contains a reference count of zero. Even though this subgraph 160 cannot be accessed by the program, the reference counts are non-zero. A garbage collector in this instance will have to select a node and search through the entire subgraph to determine that no node in the subgraph is referenced by a node outside of the subgraph. It can then eliminate subgraph 160 as garbage.

Many reference counting systems use a "stop the world" type of synchronous garbage collection, where all processes or threads other than the garbage collector are stopped. This means that the reference counts are not changing while the garbage collector collects garbage. However, "stop the world" garbage collection can take too much time. In fact, garbage collectors of this type have been known to run for many seconds or even minutes on large systems, which is too long for critical applications. Thus, concurrent garbage collection, which allows processes to run during garbage collection, is becoming increasingly necessary.

Concurrent collection of garbage creates additional problems, however. One of these problems is illustrated in FIG. 2. In FIG. 2, subgraph 160 is considered to be garbage once edge 115 is removed. However, node 210 might add edge 220 shortly before edge 115 is removed. This would cause the reference count for node 130 to be increased to two. If garbage collection occurs before edge 220 is added but after edge 115 is removed, a garbage collector will determine that subgraph 160 and its nodes 125, 130, and 135 are garbage. However, they are not garbage because node 210 has added or will add edge 220 to allow node 210 to reference node 130.

Concurrent collection of garbage therefore adds additional problems to garbage collection in reference counting garbage collection systems. Techniques for concurrent collection of garbage exists, but these techniques do not use reference counting.

Thus, better techniques are needed for concurrent collection of cyclic garbage in reference counting computer systems.

SUMMARY OF THE INVENTION

The present invention provides techniques that allow concurrent collection of cyclic garbage on reference counting systems. In general, candidate objects are found that may be part of cyclic garbage. Each candidate object has a reference count. Two tests are performed to determine if concurrent operations have affected the reference counts of the candidate objects. If concurrent operations have not affected the reference counts, the candidate objects are collected as garbage. Additionally, during garbage collection, the decrements to reference counts are delayed so that increments occur before decrements and so that decrements are held a predetermined time before being applied. This prevents decrementing a reference and collecting a cycle as garbage right before a reference is added to an object in the cycle.

A more complete understanding of the present invention, as well as further features and advantages of the present invention, will be obtained by reference to the following detailed description and drawings.

BRIEF DESCRIPTION OF THE DRAWINGS

FIGS. 8 and 9 are exemplary listings of pseudocode instructions used to implement concurrent garbage collection of cyclic data structures in a reference counting computer system, in accordance with one embodiment of the present invention;

DETAILED DESCRIPTION OF PREFERRED EMBODIMENTS

Figure 1:
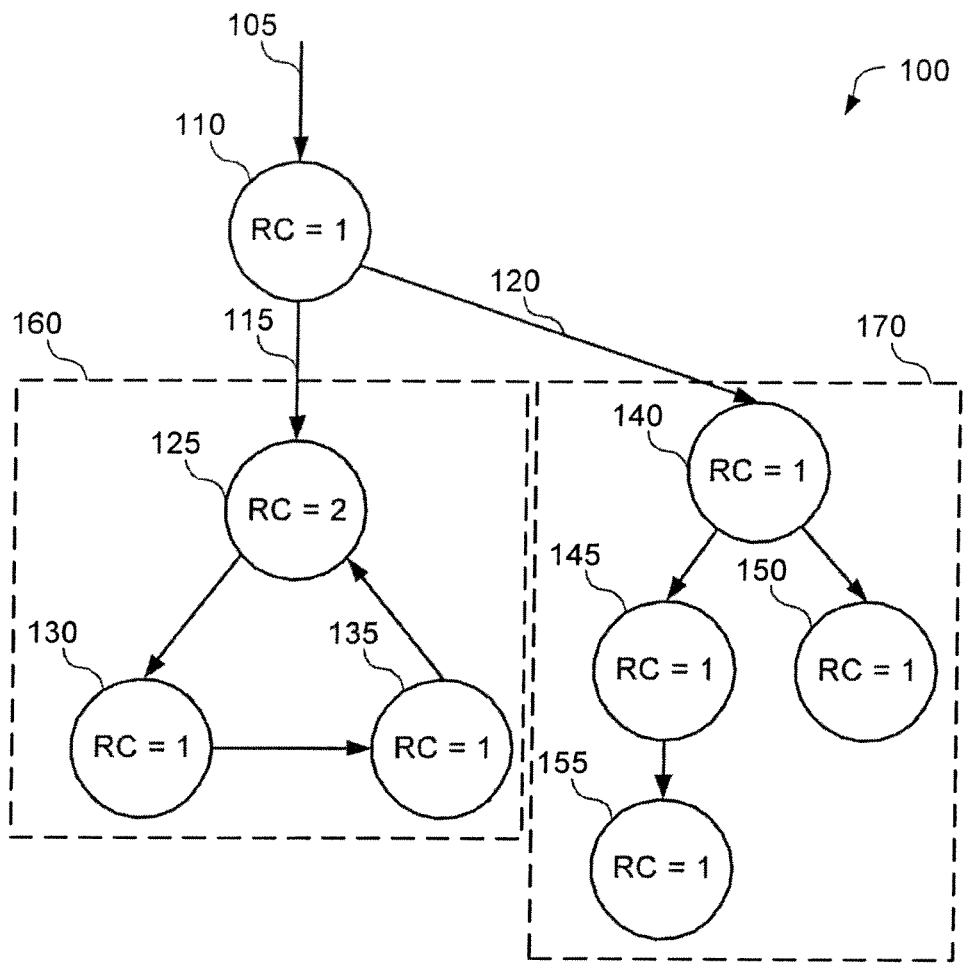
FIGS. 1 and 2 are exemplary diagrams of a subgraph and data structures therein.
Figure 2:
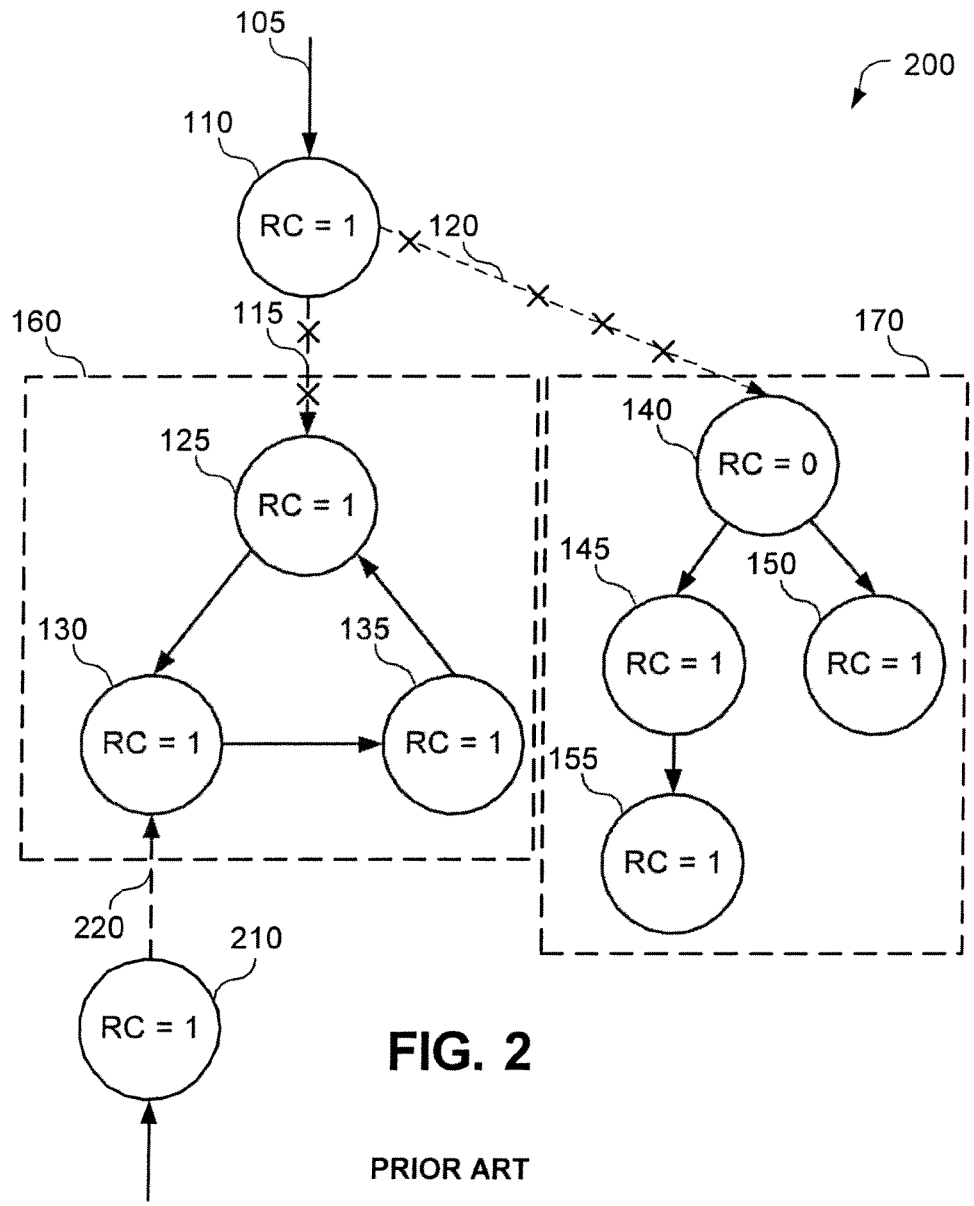

The present invention provides techniques that allow concurrent collection of cyclic garbage on reference counting systems. In general, candidate objects are found that may be part of cyclic garbage. To find candidate objects that may be part of cyclic garbage, techniques in the following reference may be used: D. Bacon, "Synchronous Collection of Cyclic Garbage in Reference Counting Systems," Ser. No. 10/011, 051, filed on Dec. 7, 2001, the disclosure of which is hereby incorporated by reference. However, the tests of the present invention do not depend on any property of the technique that finds candidate objects. Thus, any technique that can find candidate objects may be used.

Generally, a root buffer is used to store objects that may be roots of cyclic garbage. From the root buffer, a cycle buffer is created. Basically, each root in the root buffer describes a cycle that may be garbage. These cycles are added to the cycle buffer. Thus, the cycle buffer contains a number of complete cycles, where each cycle may be garbage. The cycle buffer increases the speed at which cycles are traversed. The root buffer and cycle buffer are not necessary to the practice of the present invention, and other types of data structures may be used.

Two tests are performed on the cycles in the cycle buffer to determine if concurrent operations have affected the reference counts of the candidate objects. These two tests are called the "delta test," or Δ-test, and "sigma test," or Σ-test, herein. If concurrent operations have not affected the reference counts, the candidate objects from the cycles in the cycle buffer are collected as garbage.

Additionally, during garbage collection, the decrements to reference counts are delayed so that increments occur before decrements. Moreover, decrements are further delayed a predetermined period. Generally, increments from a current epoch are applied to reference counts, as are decrements from a previous epoch. The definition of "epoch" changes depending on the process being discussed. For single processors, each "epoch" is separated by collections, which is where increments and decrements are sent to a garbage collector. For a number of processors in a system where a garbage collector runs on one of the processors, on the processor running the garbage collector, each epoch is separated by a period when the garbage collector has acted on the increments and decrements. Each epoch ends when all processors have again sent the contents of their mutator buffers to the garbage collector. Decrements from the current epoch are stored and applied in the next epoch. This prevents decrementing a reference and collecting a cycle as garbage right before a reference is added to an object in the cycle.

Before proceeding further, it is worthwhile to discuss some conventions used in this specification. The terms "node" and "object" are considered interchangeable, as are "edge" and "reference," and "graph" and "object diagram." An edge connects one node to the same node or another node in a graph, while a reference connects one object to itself or another object in an object diagram. Graph theorists tend to use the former terms, while software engineers use the latter terms. Additionally, the term "cycle" will be used to indicate a series of nodes that are cyclic and potentially garbage.

Also, nodes or objects will generally be "marked" with a "color" in the upcoming discussion. The color analogy is widely used in literature that discusses garbage collection, an it will be retained here. The meanings of the colors used herein are as follows: black indicates that a node is "in use" or "free"; gray indicates that a node is a possible member of a cycle; white indicates that a node is a member of a cycle; purple indicates a possible root of a cycle; red indicates that a node is part of a candidate cycle undergoing sigma computation; and orange indicates that a node is part of a candidate cycle awaiting an epoch boundary.

Figure 3:
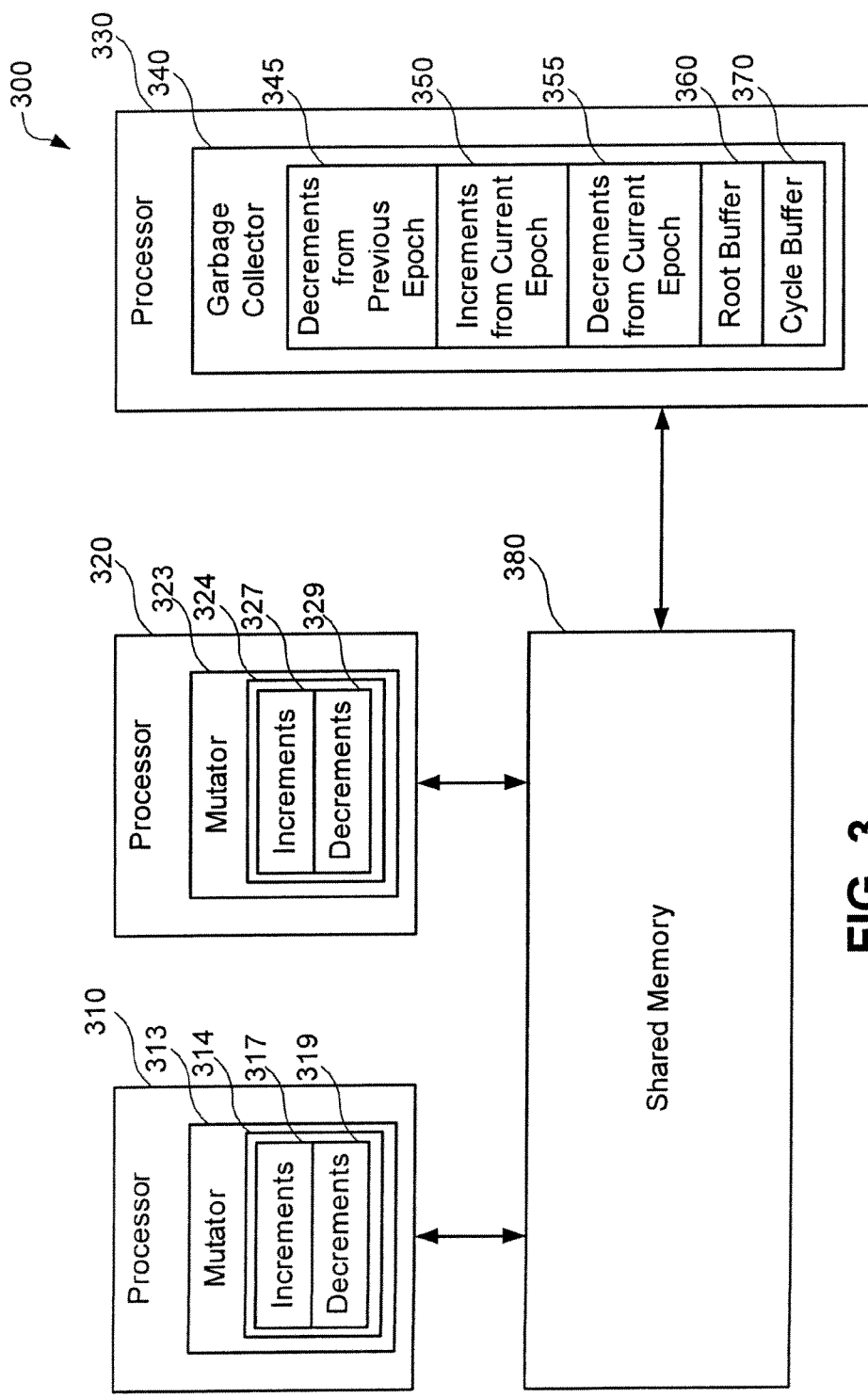
FIG. 3 is a block diagram of a system that performs concurrent reference counting garbage collection in accordance with one embodiment of the present invention.

Referring now to FIG. 3, a system 300 is shown that performs concurrent reference counting garbage collection in accordance with one embodiment of the present invention. System 300 comprises three processors 310, 320, and 330 that operate in parallel and independently, and shared memory 380. Processors 310, 320, and 330 can each access shared memory 380. Processor 310 comprises a mutator 313 that keeps track of increments 317 and decrements 319 to objects (not shown) on processor 310. The increments 317 and decrements 319 are stored in mutator buffer 314 for this purpose. Similarly, processor 320 comprises a mutator 323 that keeps track of increments 327 and decrements 329 to objects (not shown) on computer system 320. The increments 327 and decrements 329 are stored in a mutator buffer 324 for this purpose. Processor 330 comprises a garbage collector 340 that keeps track of decrements from a previous epoch 345, increments from a current epoch 350, decrements from a current epoch 355, root buffer 360, and cycle buffer 370. As shown, each processor includes some type of memory that is used to store its respective processes and data.

Periodically, mutator 313, 323 sends the contents of its mutator buffer 314, 324 to garbage collector 340. This occurs once each epoch. At the beginning of an epoch, the garbage collector 340 applies the increments from the current epoch 350. Then the garbage collector 340 applies the decrements from the previous epoch 345. During this process, the garbage collector 340 modifies root buffer 360. The garbage collector 340 stores the decrements from the current epoch in location 355. During the next epoch, these decrements will be applied.

After the increments for the current epoch 350 and decrements for the previous epoch 345 have been applied, the garbage collector 340 will perform concurrent garbage collection. Concurrent garbage collection is described in more detail in reference to FIG. 5. What is important to note is that mutators 313 and 323 act independently from themselves and from garbage collector 340. Therefore, while garbage collector 340 is modifying reference counts of objects, mutators 313 and 323 may be adding references to these objects or removing references from these objects. Moreover, because the mutators only periodically send changes to reference counts to the garbage collector 340, the garbage collector 340 has to act within the confines of this delayed notice. Techniques for garbage collection under these circumstances must take these conditions into account. It is also important to note that, while mutators 313, 323 keep track of reference addition and deletions, only the garbage collector 340 is allowed to modify the reference count for objects.

It should be noted that the data in each computer system may be separately stored from the software operating on it. For example, the mutator buffer 314 is shown as part of mutator 313, but mutator buffer 314 could be stored separately from imitator 313. FIG. 3 is depicted to aid understanding. It should also be noted that each processor 310, 320, and 330 could be part of a separate computer system, and that portions or all of what is shown for each processor may be stored in shared memory 380. For example, mutator 313 may be stored in shared memory 380 and moved from shared memory 380 into memory (e.g., L1 or L2 cache) in processor 310 when the mutator 313 is executed.

Figure 4:
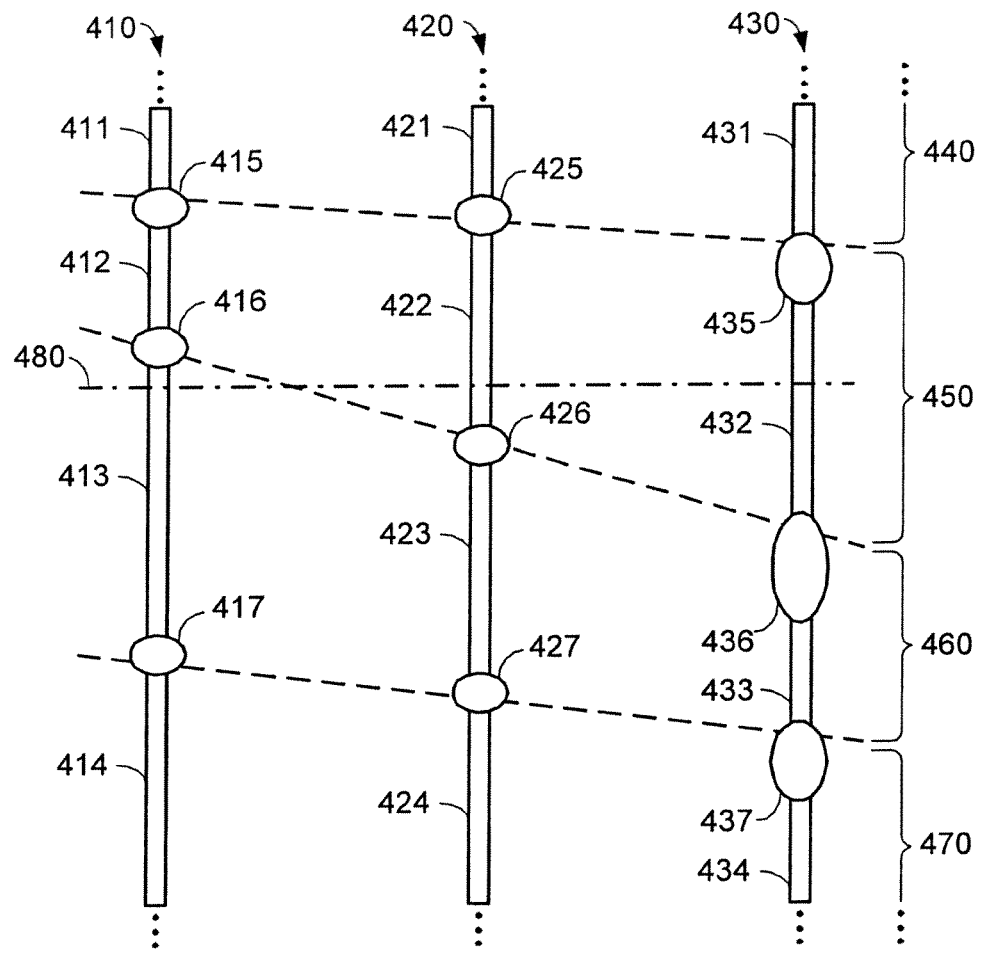
FIG. 4 is a diagram of execution timelines for three processors, one of which executes a garbage collector, in accordance with one embodiment of the present invention.

Turning now to FIG. 4, a diagram is shown of execution timelines for three processors. There are three timelines shown: a timeline 410 that corresponds to processor 310 of FIG. 3; a timeline 420 that corresponds to processor 320 of FIG. 3; and a timeline 430 that corresponds to processor 330 of FIG. 3. FIG. 4 also helps to illustrate and describe epochs.

Timeline 410 comprises areas 411, 412, 413, and 414 where processes or threads are executed, and interruptions 415, 416 and 417 by a garbage collector thread running on that computer system. Similarly, timeline 420 comprises areas 421, 422, 423, and 424 where processes or threads are executed, and interruptions 425, 426 and 427 by a collector thread running on that computer system. Timeline 430 comprises areas 431, 432, 433, and 434, where processes or threads are executed. Periods 435, 436, and 437 are times when the garbage collector executes.

As previously discussed, the mutators produce operations on reference counts, which are placed into buffers and periodically turned over to the garbage collector (also called "collector" herein), which runs on its own processor. The collector is single-threaded, and is the only thread in the system which is allowed to modify the reference count fields of objects. Generally, a collector thread actually transmits the contents of the mutator buffer. Thus, the mutator creates increments and decrements and a collector thread sends the contents of the mutator buffer to a garbage collector running on its own processor.

For example, during interrupt 415, a collector thread sends the contents of the mutator buffer created on processor 310 (not shown), which creates timeline 410, to the garbage collector. The garbage collector runs on processor 330, which creates timeline 430. During interrupt 425, a second collector thread sends the contents of the mutator buffer created on processor 320 (not shown), which creates timeline 420, to the garbage collector. The garbage collector then runs in period 435.

During mutator operation, updates to the stacks are not reference-counted. Only heap updates are reference-counted, and those operations are deferred with a write barrier by storing the addresses of objects whose counts must be adjusted into mutation buffers, which contain increments or decrements. Objects are allocated with a reference count of one, and a corresponding decrement operation is immediately written into the mutation buffer. In this manner, temporary objects never stored into the heap are collected quickly.

As has been discussed, time is divided into epochs, which are separated by collections that comprise each processor briefly running its collector thread. In FIG. 4, epochs 440, 450, 460 and 470 are shown. These epochs are determined from the point of view of timeline 430. Epoch boundaries are staggered, the only restriction being that all processors must participate in one collection before the next collection can begin. Periodically, some event will trigger a collection cycle. This trigger could occur because a certain amount of memory has been allocated, because a mutation buffer is full, or because a timer has expired. In normal operation, none of these triggers will cause the mutator to block; however, they will schedule the collector thread to run on the first processor.

On the first processor, when the collector thread wakes up, it scans the stacks of its local threads and places the addresses of objects in the stack into a stack buffer. It then increments its local epoch number, allocates a new mutation buffer, and schedules the collector thread on the next processor to run. Finally, it dispatches to the thread that was interrupted by collection. The collector thread performs these same operations for each processor until it reaches the last processor. The last processor actually performs the work of collection.

This is shown in FIG. 4, where timeline 410 periodically runs a collector thread in interrupts 415, 416, and 417 and where timeline 420 periodically runs a collector thread in interrupts 425, 426, and 427. The garbage collector then runs on the last processor, processor 330 that creates timeline 430, in periods 435, 436, and 437.

The last processor scans the stacks of its local threads into a stack buffer. Then it processes increments in the following manner. The reference count of each object addressed in the stack buffer, for the current epoch computed by each processor, is incremented. Then the mutator buffer for each processor for the current epoch is scanned, and the increment operations it contains are performed.

To avoid race conditions that might cause the collector to process a decrement before the corresponding increment has been processed, the increment operations are processed first and the decrement operations are processed one epoch behind. So the last processor scans the stack buffers of the previous epoch, and decrements the reference counts of objects that they address, and then processes the mutation buffers of the previous epoch, performing the decrement operations.

During the decrement phase, any object whose reference count drops to zero is immediately freed, and the reference counts of objects it points to are recursively decremented. Finally, the stack and mutation buffers of the previous epoch are returned to the buffer pool, and the epoch number is incremented. The collection has finished and all processors have joined the new epoch, and now any processor can trigger the next collection phase.

The reason for processing increments of the current epoch and delaying decrements one epoch is shown in FIG. 4. Assume that increments and decrements are processed as they arrive. Assume, at time 480, that a mutator running in timeline 410 increments a reference to an object. This increment will be sent to the garbage collector during interrupt 417. Also assume that, at the same time 480, a mutator running in timeline 420 decrements a reference to the same object. This decrement will be sent to the garbage collector during interrupt 426. This means that the garbage collector could, if the decrement is immediately processed, decrement the reference count for this object during period 436. If the reference count for the object drops to zero or if the reference count is positive but the object is part of a cycle, the object will be collected as garbage in period 436.

However, the object should not be garbage because the mutator running in timeline 410 has incremented the reference count to the object. This increment will not be processed until it is sent in interrupt 417 and until the garbage collector runs in period 437. Thus, increments from the current epoch are performed first and decrements from a previous epoch are performed last. In the previous scenario, this means that the decrement at time 480 would not be processed until period 437 and also after the increment has been processed in period 437.

Note that the definitions of epoch as used herein mean that part of each period 435, 436, and 437 performs the decrements and increments to the reference counts. This part is in one epoch, while the part of each period 435, 436, and 437 that performs cyclic garbage collection is in another epoch. Using this definition, an increment that occurs in epoch 450 is acted upon in epoch 450. Other definitions may be used, and the definition above is used herein solely to maintain consistent terminology. For instance, all of periods 435, 436, and 437 could be considered as part of a current epoch. Using this definition, increments from the immediately proceeding epoch are applied, then decrements from two epochs ago are applied. In FIG. 4, in period 437, increments from epoch 460 are applied and then decrements from period 450 are applied. What is important is that an increment created by one processor before its collection period occurs will be processed prior to processing a decrement created by another (or the same) processor before two of its collection periods have occurred.

Figure 5:
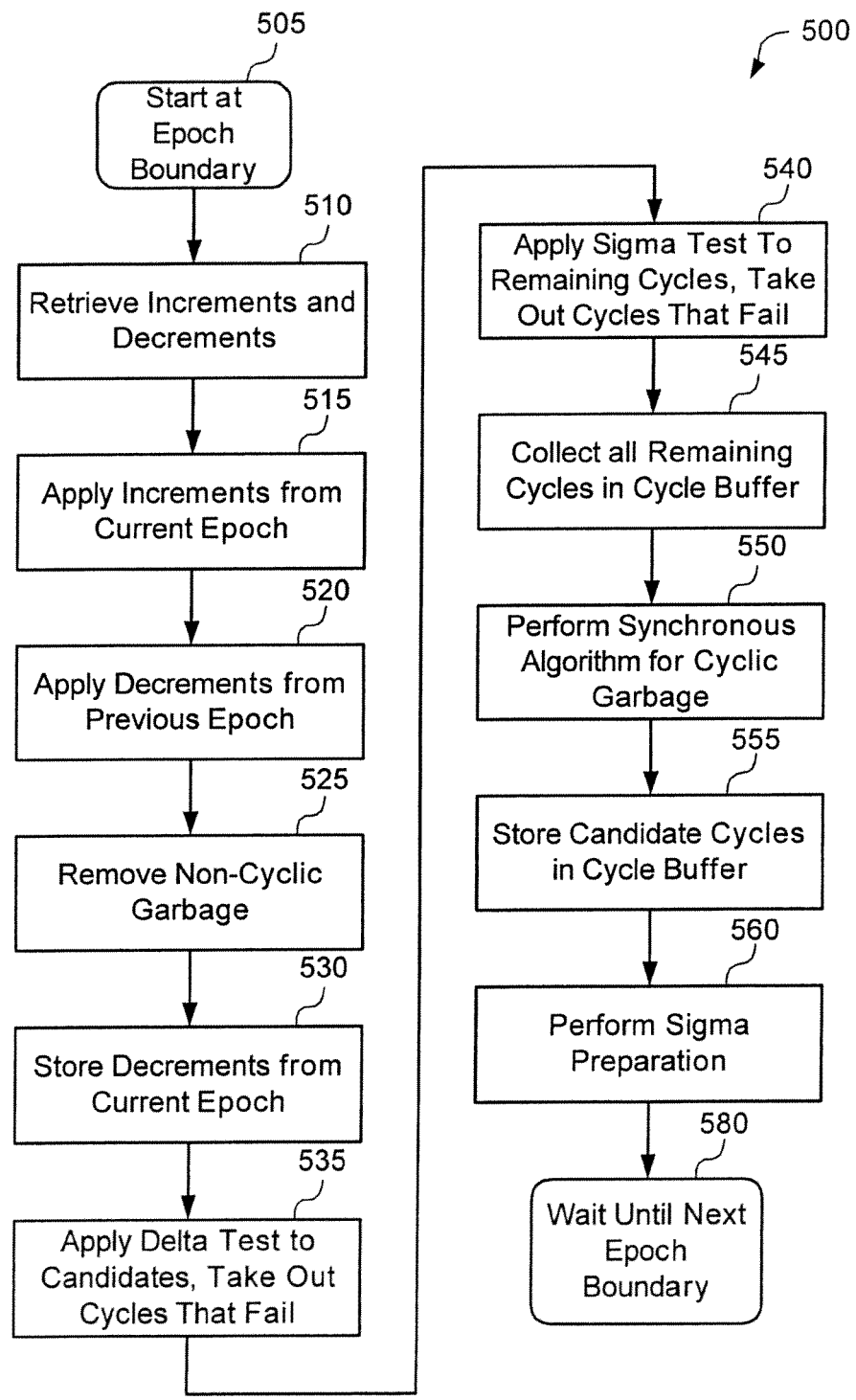
FIG. 5 is a flowchart of a method of concurrent garbage collection for cyclic data structures in a reference counting computer system, in accordance with one embodiment of the present invention.

Referring now to FIG. 5, a method 500 is shown for concurrent garbage collection of cyclic data structures in a reference counting computer system, in accordance with one embodiment of the present invention. Method 500 is performed by a garbage collector after increments and decrements from the current epoch have been transmitted by all of the processors in a system. Method 500 is preferably performed once each epoch and starts, as indicated in step 505, at the epoch boundary.

Thus, prior to step 505, the increments and decrements for the current epoch have been sent by processors in the system. Additionally, other steps are taken in step 505, such as allocating memory and scanning stack buffers.

In step 510, the increments and decrements from all of the processors are retrieved, generally from shared memory. In step 515, increments from the current epoch are applied, and, in step 520, decrements from the previous epoch are applied. As discussed above, delaying processing of decrements for one epoch ensures that increments will be added before decrements. This prevents the possibility of a cycle from being removed if an increment occurs after a decrement.

In step 525, non-cyclic garbage is removed, which means that any object whose reference count is zero is collected as garbage. In step 530, decrements from the current epoch are stored. These will be used the next time method 500 is run. At that time (i.e., an epoch later), these will be decrements from a previous epoch.

As with other concurrent garbage collection algorithms, method 500 must contend with the fact that the object graph may be modified simultaneously with the scanning of it by the garbage collector. In addition, the reference counts may be as much as a two epochs out of date (because decrements are deferred by an epoch).

Method 500 relies on the same basic premise as the synchronous algorithm described in the filed application entitled "Synchronous Collection of Cyclic Garbage in Reference Counting Systems," which has been incorporated by reference above. This premise is that given a subset of nodes, if deleting the internal edges between the nodes in this subset reduces the reference count of every node in the subset to zero, then the whole subset of nodes is cyclic garbage. The subset may represent more than one independent cycle, but all of the cycles in the subset are all garbage cycles.

However, since the graph may be modified, there are three basic difficulties. Firstly, since one cannot rely on being able to retrace the same graph, the repeated traversal of the graph does not always define the same set of nodes. Secondly, the deletion of edges can disconnect portions of the graph, thus making the global test by graph traversal difficult. Thirdly, reference counts may be out of date.

To deal with these difficulties, the cyclic garbage collection portion of method 500 proceeds in two phases. In the first phase, a candidate set of garbage nodes is discovered. Then method 500 waits until an epoch boundary and performs the second phase in which tests are performed to ensure that the candidates do indeed satisfy the criteria for garbage cycles.

The two phases can be viewed as enforcing a "liveness" and a "safety" property. The first phase enforces liveness by ensuring that potential garbage cycles are considered for collection. The second phase ensures safety by preventing the collection of false cycles induced by concurrent mutator activity. The liveness phase is performed by steps 550 through 580, while the safety phase is performed by steps 535 and 540.

Before discussing the liveness and safety phases, it is worthwhile to note that certain steps of method 500 may not be performed for every epoch. For example, the first time method 500 is run, steps 510 through 545 may not be performed if there are no increments or decrements. If there are increments and decrements the first time method 500 is performed, step 520 will not be performed because there is no "previous" epoch. Additionally, if there are no candidate cycles after step 525 is performed, then steps 535 through 545 need not be performed. The following discussion assumes that no candidate cycles remain after step 525, such that steps 535 through 545 need not be performed. This assumption is made simply to enable description of the liveness phase prior to description of the safety phase of method 500.

The liveness phase comprises steps 550 through 580. In step 550, candidate cycles are determined through the use of a synchronous garbage collection algorithm. The synchronous method described in "Synchronous Collection of Cyclic Garbage in Reference Counting Systems," incorporated by reference above, may be used to find candidate cycles. Alternatively, other reference counting methods may be used to find candidate cycles. Finding and marking candidate cycles occurs in step 550. Candidate root nodes are initially marked as purple and stored in a root buffer. During step 550, the root nodes are used to search cycles, and cycles that are possibly garbage are collected and placed into a cycle buffer (referred to as a "CycleBuffer" herein). The objects in the cycle buffer are colored orange.

As previously discussed, due to concurrent mutator activity, the graph may be changing and a synchronous method of garbage collection may produce incorrect results. To perform concurrent cycle collection, a second reference count for each object, denoted CRC(S), is created. This occurs in step 555. The Cyclic Reference Count (CRC) is a hypothetical reference count that may become incorrect due to concurrent mutator activity. In one embodiment, the reference counts, the cyclic reference count, the color, and a buffered flag are placed into a single header word by using a hash table to hold count overflows, which occur very rarely. The buffered flag is described in "Synchronous Collection of Cyclic Garbage in Reference Counting Systems," and its use is optional but beneficial. The liveness phase of the concurrent method 500 proceeds in a similar manner to the synchronous cycle collection method described in "Synchronous Collection of Cyclic Garbage in Reference Counting Systems." However, in the concurrent method 500, when an object is marked gray, its cyclic reference count is initialized to its true reference count and the "true" reference count is not changed. The cyclic reference count is created in step 555. Henceforward, the mark, scan, and collect phases, of the synchronous cycle collection method described in "Synchronous Collection of Cyclic Garbage in Reference Counting Systems," operate upon the cyclic reference count instead of the true reference count.

By using the cyclic reference count, it is ensured that, in the event of concurrent mutator activity, the information about the true reference count of the objects is never lost. In absence of mutator activity, the liveness phase will yield the set of garbage nodes, and the safety phase will certify that this indeed is a set of garbage of nodes and these garbage nodes can be collected.

However, the presence of concurrent mutator activity can cause live nodes to enter the list in three different ways. Firstly, the mutator can add an edge, thus causing the marking procedure of the synchronous method to incorrectly infer that there are no external edges to a live object. Secondly, the mutator can delete an edge, thus causing the scan procedure of the synchronous method to incorrectly infer a live object to be garbage. Thirdly, the deletion of edges concurrent to running of the marking and scanning procedure can create gray and white nodes with various values of cyclic reference counts. While eventually the reporting of the mutator activity will cause these nodes to be detected and re-colored, if these nodes are encountered before they are re-colored, they can mislead the runs of the above procedures into inferring that they are garbage.

Another step in the liveness phase is a $\Sigma$-preparation step, which is step 560. In the $\Sigma$-preparation step 560, which is preferably performed immediately after the candidate cycles have been found, each subset in the CycleBuffer is iterated over and the cyclic reference count of every node in the subset is initialized to the reference count of the node. Then every node in the subset is iterated over again and the cyclic reference count of any children of the node that are also in the subset are decremented. At the end of the $\Sigma$-preparation computation, the cyclic reference count of each node in the subset represents the number of references to the node from nodes external to the subset. Step 580 effectively computes external reference counts for each object. In step 580, method 500 ends until the next epoch boundary occurs. In this step, such functions as deallocating memory and returning control to the operating system may be performed.

The output of the liveness phase is a set of nodes believed to be garbage and placed in a CycleBuffer data structure. The job of the liveness phase can be seen as finding likely sets of candidates for garbage cycles. If the mutator activity is small in a given epoch, this would indeed be very likely to be true.

The CycleBuffer is divided into discrete connected components, each of which forms a potential garbage cycle. This is explained in more detail in reference to FIG. 6. Due to mutator activity, the contents of the CycleBuffer can be a superset of the actual not of garbage nodes and can contain some nodes that fail tests in the safety phase.

Assume now that the next epoch boundary has occurred, that steps 505 through 530 have been performed, and that the CycleBuffer is not empty. At this point, the second phase of the algorithm is performed. The second phase of the algorithm will now be described.

The second ("safety") phase of the algorithm takes, as input, a set of nodes and determines whether they form a garbage cycle. These nodes have already been marked with a special color, orange, which is used to identify a candidate set in the concurrent cycle collector. The safety phase of method 500 comprises two tests called the $\Delta$-test and the $\Sigma$-test. The $\Delta$-test is performed in step 535, and the $\Sigma$-test is performed in step 540. If a subset of nodes of the object graph passes both the $\Delta$-test and the $\Sigma$-test, then it is assured that the nodes in the subset are all garbage. Thus, correctness of the safety phase of method 500 is not determined by any property of the output of the liveness phase which selects the subgraphs. This property of the safety phase of the algorithm considerably simplifies the proof of correctness as well as modularizing the code.

In step 535, the $\Delta$-test is performed. This test ensures that no new reference was added to an object in a cycle. Because mutator activity can occur in parallel with garbage collection, the reference count used during the running of the preparation procedure may be outdated due to an increment to one of the nodes in a subset in the CycleBuffer. Any increments are ascertained by the $\Delta$-test in step 535. It should be noted that, in step 515, increment processing will re-color black all non-black nodes and their reachable subgraphs. Then it is determined if the candidates are still garbage in step 535. To do this, the nodes in the candidate set are scanned and are tested to determine whether their colors are still orange. If they are all orange, there has been no increment to the reference count since the running of the preparation procedure (step 560) and the candidate set passes the $\Delta$-test. Any cycle or object that fails the test is removed from the CycleBuffer in step 535.

The $\Sigma$-test, as part of the safety phase of method 500, ensures that all references to objects in a set are from objects within the set. In the $\Sigma$-test, which is performed in step 540, every node in the subset is iterated over and every node is tested to determine if its cyclic reference count is zero. If the cyclic reference count is zero for every member of the set, then it is known that there exists no reference to this subset from any other node. Therefore, any candidate set that passes the $\Sigma$-test is garbage, unless the reference count used during the running of the preparation procedure is outdated due to an increment to one of the nodes in the subset. However, the $\Delta$-test, performed in step 535, has already been performed and has removed any cycle or node whose reference count is outdated due to an increment. In step 540, any cycle that fails the $\Sigma$-test is not garbage and is removed from the CycleBuffer.

Any subset of garbage nodes that does not have any external pointers to it will pass both the $\Delta$-test and the $\Sigma$-test. Note that method 500 does not have to be concerned with concurrent decrements to the members of the subset, since it is not possible for the reference count of any node to drop below zero. However, it is possible for a set of garbage to have pointers to it from other garbage cycles. It is also known that the garbage cycles in the cycle buffer cannot have any forward pointers to other garbage cycles (if they did, method 500 would have followed them and included them in a previous garbage cycle). Hence, the candidate cycles are processed in the cycle buffer in the reverse of the order in which they were found. This reasoning is described in reference to FIG. 6.

When a candidate set passes both tests, and hence is determined to be garbage, then the nodes in the cycle are collected and freed (step 545), which causes the reference counts of other nodes outside of the cycle to be decremented. By the stability property of garbage, one can decrement such reference counts without concern for concurrent mutation. When a reference count to an orange node is decremented, its cyclic reference count is also decremented. Therefore, when the next candidate cycle is considered (the previous cycle in the buffer), if it is garbage the $\Delta$-test will succeed because the computation has been augmented by the preparation procedure (step 560). Hence, when a candidate set is reached, the cyclic reference count does not include the count of any pointers from a known garbage node. This ensures that all the nodes in would be collected.

Method 500 continues with steps 550 through 560, which have already been described. The method ends, until the next epoch, in step 580.

Figure 6:
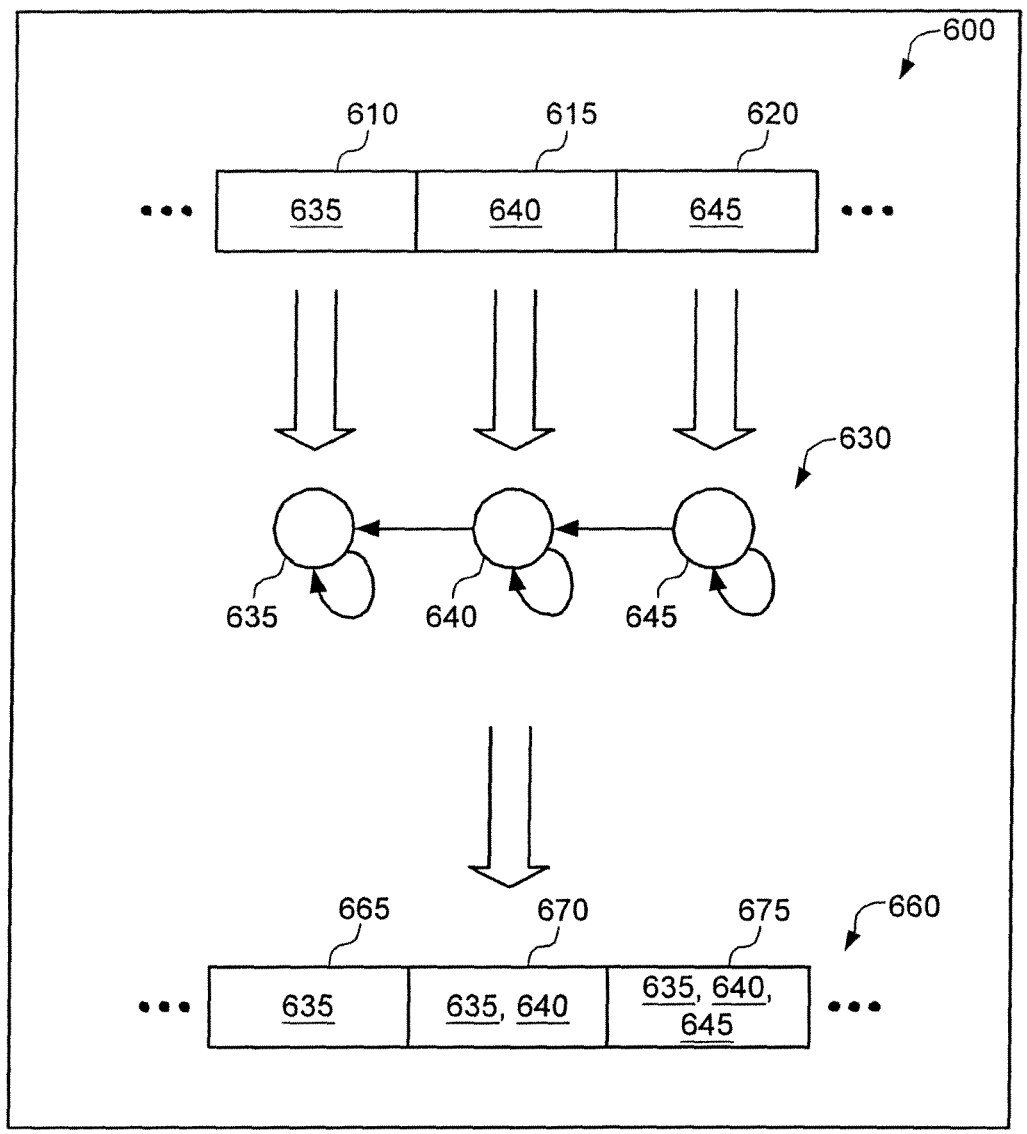
FIG. 6 is a block diagram of the creation of a cycle buffer from a root directory for one particular subgraph, in accordance with one embodiment of the present invention.

Turning now to FIG. 6, a block diagram is shown of the creation of a cycle buffer 660 from a root directory 600 for one particular subgraph 630, in accordance with one embodiment of the present invention. Root buffer 600 comprises root nodes 610, 615, and 620, which contain references to objects 635, 640, and 645, respectively. Subgraph 630 comprises three objects 635, 640, and 645. As described in "Synchronous Collection of Cyclic Garbage in Reference Counting Systems," an object may be a root of cyclic garbage if the reference count for the object is decremented to a non-zero value. In this example, which is a worst-case example for cyclic garbage collection, all three objects have had their reference counts decremented and are placed in root buffer 600 as shown. This subgraph 630 is garbage.

Cycle buffer 660 comprises complete cycles that may be garbage. In this case, there are three cycles 665, 670, and 675. Each cycle in cycle buffer 660 is created and determined from a cycle defined by a root node in root buffer 600. For example, root node 610 contains a reference to object 635, and object 635 describes a subgraph that comprises one object, itself. Cycle 665 therefore contains a reference to object 635. Root node 615 contains a reference to object 640, which describes a subgraph comprised of two objects, objects 640 and 630. Consequently, cycle 670 comprises references to objects 640 and 635. Finally, root node 620 comprises a reference to object 645, which describes subgraph 630 comprising objects 645, 640, and 635. Therefore, cycle 675 comprises references to objects 645, 640, and 635.

Cycle buffer 660 allows cycles to be easily and quickly determined and searched. It does this at the expense of memory. However, because cyclic garbage collection can be time-consuming, memory tends to be less important than time.

If the safety tests of the present invention were performed in the order of cycle 665, 670, and then 675 (i.e., the order in which the cycles are added to the cycle buffer), an inefficiency occurs. Object 635 would be examined three times, once for each cycle 665, 670, and 675, while object 640 would be examined twice, once for each cycle 670 and 675, and object 645 would be examined once for cycle 675. To prevent this inefficiency, the cycles are examined in the reverse order, starting with cycle 675 and ending with cycle 665. In this situation, at the end of performing the safety tests on cycle 675, objects 635, 640, and 645 would be freed, thereby obviating the performance of the safety tests for cycles 670 and 665. This saves several steps in computation.

Figure 7:
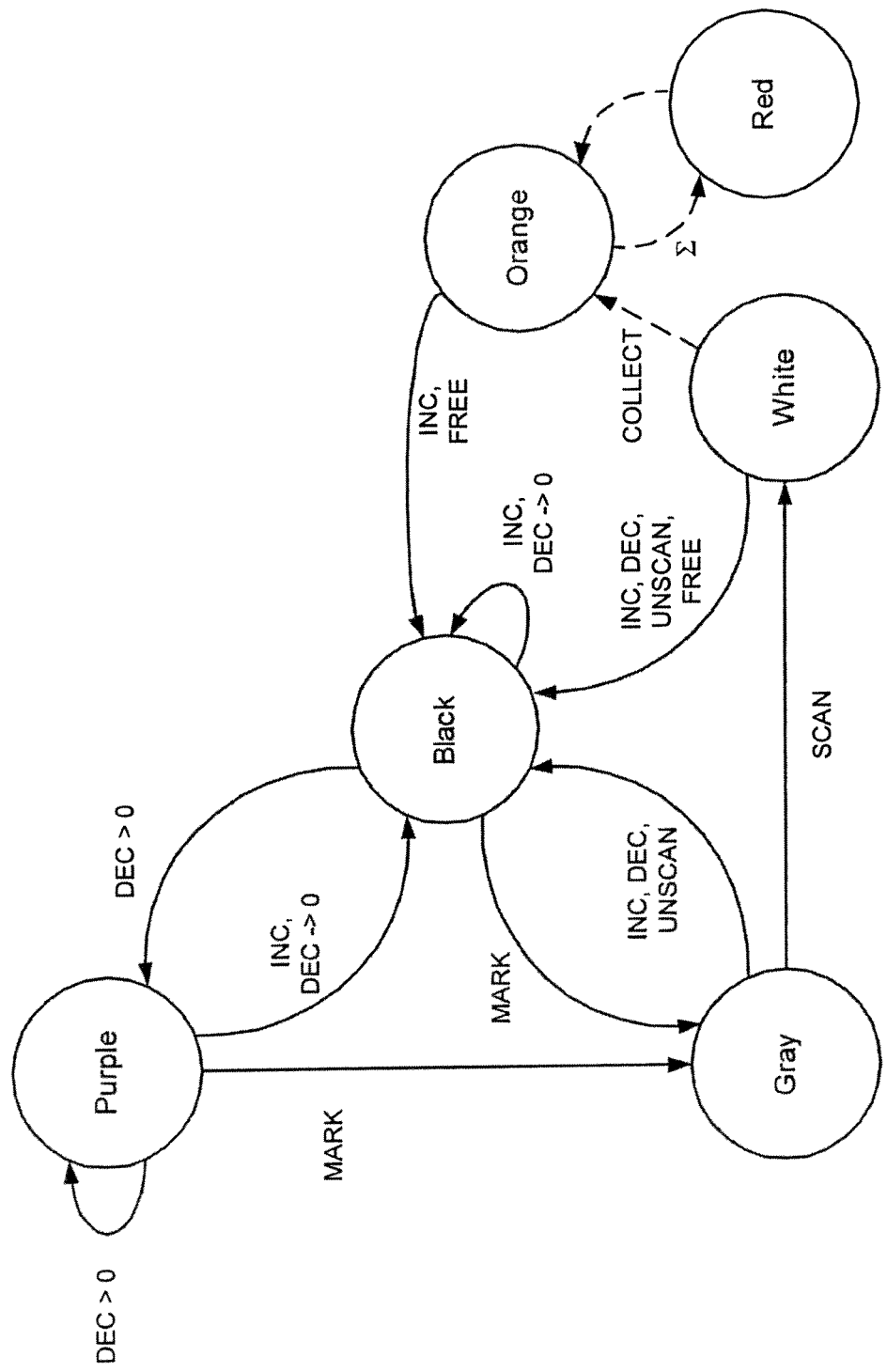
FIG. 7 is a state transition graph for concurrent garbage collection of cyclic data structures in a reference counting computer system, in accordance with one embodiment of the present invention.

Referring now to FIG. 7, a state transition graph is shown for concurrent garbage collection of cyclic data structures in a reference counting computer system, in accordance with one embodiment of the present invention. All objects start as black. As previously described, the meanings of the colors used herein are as follows: black indicates that a node is "in use" or "free"; gray indicates that a node is a possible member of a cycle; white indicates that a node is a member of a cycle; purple indicates a possible root of a cycle; orange indicates that the object is part of a candidate cycle awaiting an epoch boundary; and red indicates that the object is part of a candidate cycle undergoing a $\Sigma$-computation.

If the state is black, increments to the reference count and decrements of the reference count to zero do not change the state. A decrement of the reference count to a non-zero value will cause the object to be colored purple. While in the purple state, a decrement to the reference count to a non-zero value does not change the state. A decrement to zero or an increment will change the color to black. When method 500 of FIG. 5 performs the liveness phase of garbage collection, it will mark purple objects as gray if they have been examined.

If state is black, method 500 of FIG. 5 will change the color from black to gray during the marking phase. When the object is gray, a scan will cause the object to be marked white. A scan occurs during the scanning phase, when the object has a zero reference count. Increments, decrements, and an unscan will cause the object to be changed from gray to black. An increment and decrement are possible during concurrent mutator operation. An unscan occurs when it is determined that a cycle is not garbage.

If the object is white, a free operation, which returns the object to the heap, will mark the object as black. Additionally, increments, decrements, and unscan operations will cause the white object to be marked black. Increments and decrements are caused by concurrent mutator operation. An unscan operation occurs if a member of garbage cycle really is not garbage. For example, if an increment operation has incremented the reference count of an object in a cycle, one of the safety tests will determine this and mark black all other white objects in the cycle.

White objects can be collected, which means that they are marked orange. If a free operation or an increment operation occurs, the orange object is marked black. This can occur in the $\Delta$-test. The $\Sigma$ preparation marks an orange object red. Red is used to mark objects that belong to a particular candidate cycle.

Turning now to FIGS. 8 and 9, exemplary listings of pseudocode instructions are shown that may be used to implement concurrent garbage collection of cyclic data structures in a reference counting computer system, in accordance with one embodiment of the present invention. The pseudocode is explained below.

The operation of CollectCycles and its subsidiary procedures is very similar to the operation of the synchronous algorithm of "Synchronous Collection of Cyclic Garbage in Reference Counting Systems." called the "synchronous algorithm" herein, so for those procedures only the differences will be focused on here.

Increment(S): The true reference count is incremented. Since the reference count is being incremented, the node must be live, so any non-black objects reachable from it are colored black by invoking ScanBlack. This has the effect of re-blackening live nodes that were left gray or white when concurrent mutation interrupted a previous cycle collection.

Decrement(S): At the high level, decrementing looks the same as with the synchronous algorithm: if the count becomes zero, the object is released, otherwise it is considered as a possible root.

PossibleRoot(S): For a possible root, first ScanBlack is performed. As with Increment, this has the effect of re-blackening leftover gray or white nodes. It may also change the color of some purple nodes reachable from S to black, but this is not a problem since they will be considered when the cycle collector considers S. The rest of PossibleRoot is the same as for the synchronous algorithm.

ProcessCycles( ): Invoked once per epoch after increment and decrement processing due to the mutation buffers from the mutator threads has been completed. First, FreeCycles attempts to free candidate cycles discovered during the previous epoch. Then CollectCycles collects new candidate cycles and SigmaPreparation prepares for the $\Sigma$-test to be run in the next epoch.

CollectCycles( ): As in the synchronous algorithm, three phases are invoked on the candidate roots: marking, scanning, and collection.

MarkRoots( ): This procedure is the same as in the synchronous algorithm.

ScanRoots( ): This procedure is the same as in the synchronous algorithm.

CollectRoots( ): For each remaining root, if it is white a candidate cycle has been discovered starting at that root. The CurrentCycle is initialized to be empty, and the CollectWhite procedure is invoked to gather the members of the cycle into the CurrentCycle and color them orange. The collected cycle is then appended to the CycleBuffer. If the root is not white, a candidate cycle was not found from this root or it was already included in some previously collected candidate, and the buffered flag is set to false. In either case, the root is removed from the Roots buffer, so that at the end of this procedure the Roots buffer is empty.

MarkGray(S): This is similar to the synchronous version of the procedure, with adaptations to use the cyclic reference count (CRC) instead of the true reference count (RC). If the color is not gray, it is set to gray and the CRC is copied from the RC, and then MarkGray is invoked recursively on the children. If the color is already gray, and if the CRC is not already zero, the CRC is decremented (the check for non-zero is necessary because concurrent mutation could otherwise cause the CRC to underflow).

Scan(S): As with MarkGray, simply an adaptation of the synchronous procedure that uses the CRC. Nodes with zero CRC are colored white; non-black nodes with CRC greater than zero are recursively re-colored black.

ScanBlack(S): Like the synchronous version of the procedure, but it does not need to re-increment the true reference count because all reference count computations were carried out on the CRC.

CollectWhite(S): This procedure recursively gathers white nodes identified as members of a candidate garbage cycle into the CurrentCycle and colors them orange as it goes. The buffered flag is also set true since a reference to the node will be stored in the CycleBuffer when CurrentCycle is appended to it.

SigmaPreparation( ): After the candidate cycles have been collected into the CycleBuffer, this procedure prepares for the execution of the $\Sigma$-test in the next epoch. It operates individually on each candidate cycle C. First, each node S in C has its CRC initialized to its RC and its color set to red. After this only the nodes of C are red. Then for any pointer from one node in C to another node in C, the CRC of the target node is decremented. Finally, the nodes in C are re-colored orange. At the end of SigmaPreparation, the CRC field of each node S contains a count of the number of references to S from outside of C.

FreeCycles( ): This procedure iterates over the candidate cycles in the reverse order in which they were collected. It applies the safety tests (the $\Sigma$-test and the $\Delta$-test) to each cycle and if it passes both tests then the cycle is freed. Otherwise it refurbished, meaning that it may be reconsidered for collection in the next epoch.

DeltaTest(C): This procedure returns true if the color of all nodes in the cycle are orange, which indicates that their have been no increments to any of the nodes in the cycle.

SigmaTest(C): This procedure calculates the total number of external references to nodes in the cycle, using the CRC fields computed by the SimaPreparation procedure. It returns true if the number of external references is zero, false otherwise.

Refurbish(C): If the candidate cycle has not been collected due to failing a safety test, this procedure re-colors the nodes. If the first node in the candidate cycle (which was the purple node from which the candidate was found) is still orange, or if any node has become purple, then those nodes are colored purple and placed in the Roots buffer. All other nodes are colored black and their buffered flags are cleared.

FreeCycle(C): This procedure actually frees the members of a candidate cycle that has passed the safety tests. First, the members of C are colored red; after this, only the nodes in C are red. Then for each node S in C, CyclicDecrement decrements reference counts in non-red nodes pointed to by S.

CyclicDecrement(M): If a node is not red, then it either belongs to some other candidate cycle or not. If it belongs to some other candidate cycle, then it is orange, in which case both the RC and the CRC fields are decremented (the CRC field is decremented to update the computation performed previously by the SigmaPreparation procedure to take the deletion of the cycle pointing to M into account). If it does not belong to some other candidate cycle, it will not be orange and a normal Decrement operation is performed.

For ease of presentation, the pseudocode has been presented in a way that maximizes readability. However, this means that, as presented, the code makes more passes over the nodes than is strictly necessary. For instance, the first pass by SigmaPreparation can be merged with CollectWhite, and the passes performed by DeltaTest and SigmaTest can be combined. In this implementation, the passes are combined to minimize constant-factor overheads.

Figure 10:
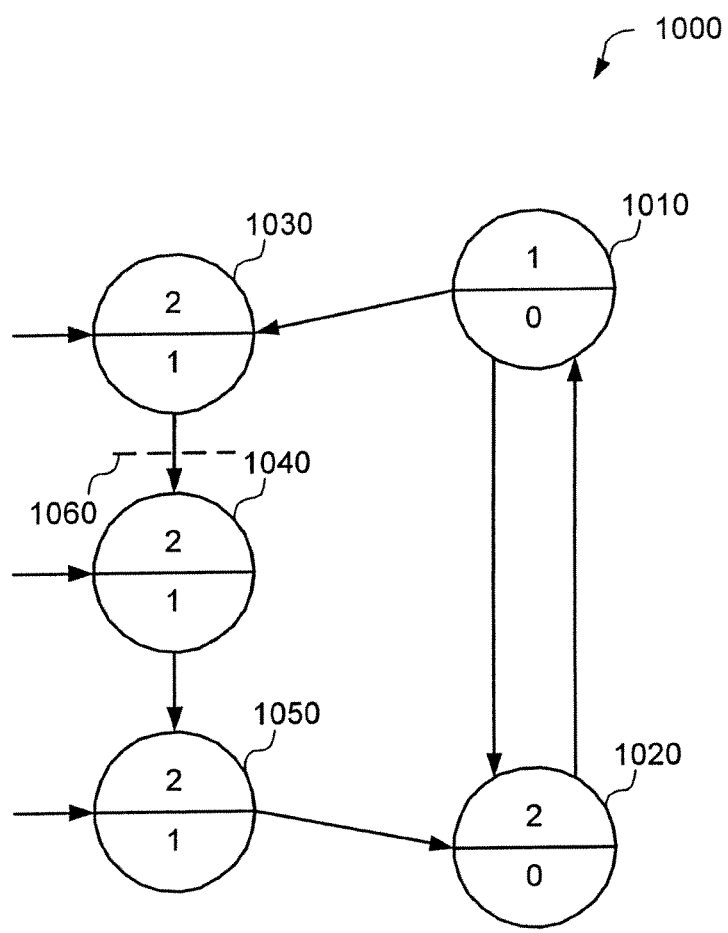
FIGS. 10 and 11 are diagrams of cyclic data structures and possible concurrent operations that can possibly create inaccuracies if both tests of the present invention are not performed.
Figure 11:
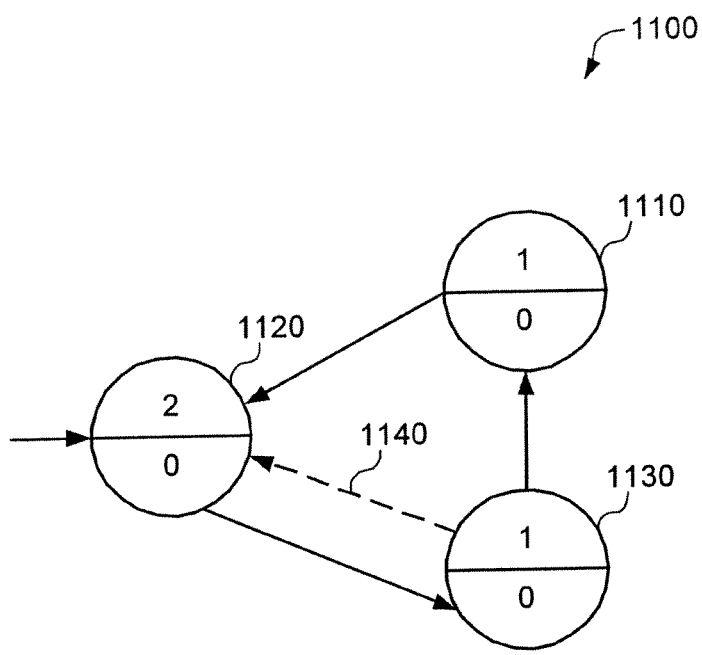

FIGS. 10 and 11 are diagrams of cyclic data structures and possible concurrent operations that can possibly create inaccuracies if both tests of the present invention are not performed. FIG. 10 illustrates a race condition uniquely detected by the $\Sigma$-test, while FIG. 11 illustrates a race condition uniquely detected by the $\Delta$-test.

Referring now to FIG. 10, a subgraph 1000 is shown that contains objects 1010, 1020, 1030, 1040, and 1050. Subgraph 100 is a cycle, but not a garbage cycle. The subgraph 1000 is described by a root entered in the root buffer because object 1010 has a decrement to its reference count that is not to zero. Each object has two counts: the top count is the reference count; and the bottom count is the cyclic reference count.

This cycle was detected from the purple node 1010, which is the starting point from which cycle collection is run. If the edge between nodes 1030 and 1040 is cut (indicated by cut 1060) between the MarkGray and the Scan routines, then the nodes 1010 and 1020 will be collected by the CollectWhite routine and form a cycle. These nodes are not garbage. However, since there have been no increments to the reference counts of either of these nodes, this set will pass $\Delta$-test. The decrements will be processed an epoch later, at epoch i+1, so the decrement to node 1040 will not have an effect on the nodes 1010 and 1020 in the FreeCycles operation performed in epoch i. Even waiting for an additional epoch does not guarantee that the fact that nodes 1010 and 1020 will be detected by $\Delta$-test, since during epoch i the edge from node 1040 to node 1050 could be cut. Indeed, by making the chain of nodes {1030, 1040, 1050} be arbitrarily long and having a malicious mutator cut edges at just the right moment, it is possible to have the non-garbage cycle of nodes pass the $\Delta$-test for arbitrarily many epochs. Hence the $\Delta$-test alone cannot detect all live nodes in the set of a candidate cycles.

Now consider the subgraph 1100 of nodes 1110, 1120, and 1130 shown in FIG. 11. The cycle is detected starting with the purple node 1110, from which cycle collection is run. If a new edge is added from node 1130 to node 1120 (as noted by edge 1140) before the MarkGray routine is run, the reference count of the node 1120 will be out of date. If the cycle collector observes the newly added edge, the sum of the reference counts in {1110, 1120, 1130} will equal the sum of the edges. Hence the set of nodes {1110, 1120, 1130} will be collected by the CollectWhite routine and form a candidate cycle. If the increments are not processed before the $\Sigma$-test is done, then this candidate cycle will pass the $\Sigma$-test. Hence the $\Sigma$-test alone cannot detect all live nodes in the set of candidate cycles.

Notice that it is not claimed that the two race conditions shown in FIGS. 10 and 11 are an exhaustive list of all possible race conditions the present invention will face. But these two are sufficient to show the necessity of both the tests. Thus, the two tests are both necessary and sufficient to ensure the safety of the algorithm. That both tests are necessary and sufficient is proven in Bacon et al., "Concurrent Cycle Collection in Reference Counting Systems," Proc. European Conf. on Object-Oriented Programming, Lecture Notes in Computer Science (LNCS), vol. 2072 (200)), the disclosure of which is incorporated herein by reference.

Figure 12:
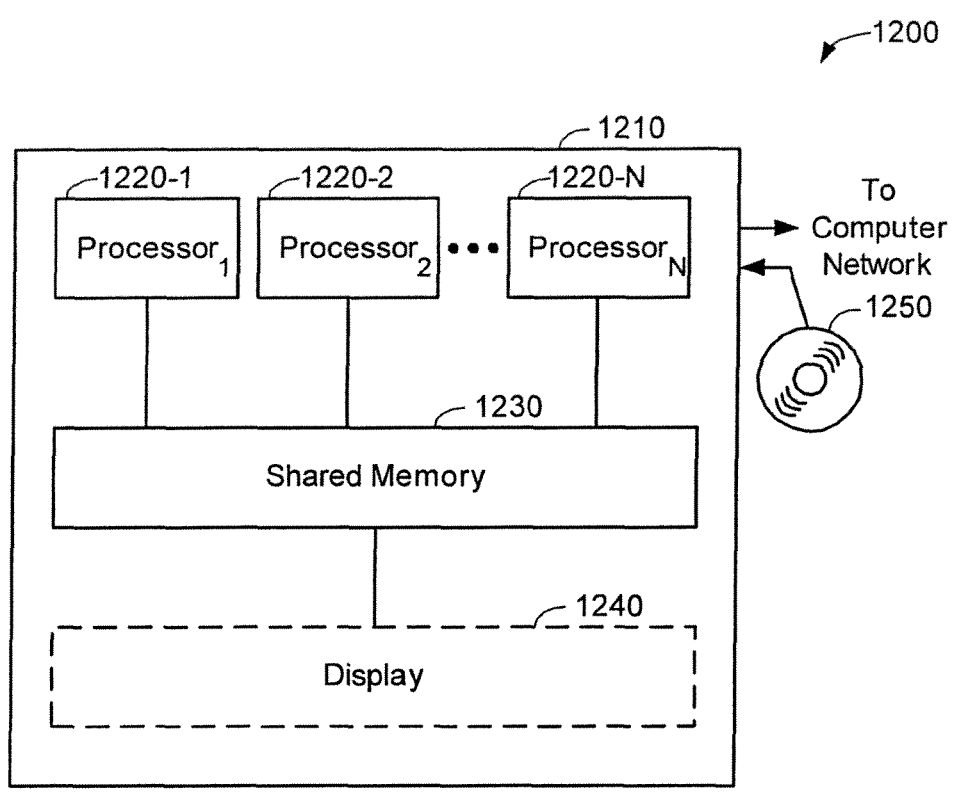
FIG. 12 is a block diagram of an exemplary system suitable for carrying out embodiments of the present invention.

Turning now to FIG. 12, a block diagram is shown of an exemplary system 1200 suitable for carrying out embodiments of the present invention. System 1200 comprises a computer system 1210 and a Compact Disk (CD) 1250. Computer system 1210 comprises N processors 1220-1 through 1220-N (collectively, "processors 1220"), a memory 1230 and an optional video display 1240.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 1210, to carry out all or some of the steps to perform the methods or create the apparatuses discussed herein. The computer-readable medium may be a recordable medium (e.g., floppy disks, hard drives, compact disks, such as CD 1250, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 1250.

Memory 1230 configures the processor 1220 to implement the methods, steps, and functions disclosed herein. The memory 1230 could be distributed or local and the processor 1220 could be distributed or singular. The memory 1230 could be implemented as an electrical, magnetic or optical memory, or any combination of these or other types of storage devices. Moreover, the term "memory" should be construed broadly enough to encompass any information able to be read from or written to an address in the addressable space accessed by processor 1210. With this definition, information on a network is still within memory 1230 because the processor 1220 can retrieve the information from the network. It should be noted that each distributed processor that makes up processor 1220 generally contains its own addressable memory space. It should also be noted that some or all of computer system 1210 can be incorporated into an application-specific or general-use integrated circuit.

Optional video display 1240 is any type of video display suitable for interacting with a human user of system 1200. Generally, video display 1240 is a computer monitor or other similar video display.

It is to be understood that the embodiments and variations shown and described herein are merely illustrative of the principles of this invention and that various modifications may be implemented by those skilled in the art without departing from the scope and spirit of the invention.

The invention claimed is:

1. A method for processing changes to reference counts in a reference counting computer system, each reference count associated with a particular object and containing a number of references that reference the particular object, the method comprising the steps of:
    determining increments and decrements of reference counts for a current time period;
    processing the increments of reference counts for the current time period;
    storing the decrements of reference counts for the current time period; and
    processing decrements of reference counts for a previous time period, wherein each of the current and previous time periods are an epoch, wherein each epoch is separated by a period where increments and decrements to reference counts are applied for all processors in a plurality of processors, and wherein one or more of said steps are performed by one or more hardware devices.

2. The method of claim 1, further comprising the steps of:
    identifying candidate objects having associated reference counts for garbage collection, wherein each candidate object is potentially garbage; and
    determining if the candidate objects are garbage, the step of determining performed without preventing mutators in the system from changing object references and the step of determining further comprising the steps of:
        determining, after a time period, if the candidate objects are still potentially garbage; and
        for those candidate objects that are still potentially garbage, determining if the reference count associated with the candidate object has changed, wherein one or more of said steps are performed by one or more hardware devices.

3. The method of claim 2, wherein:
    wherein each candidate object is potentially garbage;
    the step of determining if the candidate objects are garbage further comprises the steps of:
        determining, after a time period, if the candidate objects are still potentially garbage; and
        for those candidate objects that are still potentially garbage, determining if the reference count associated with the candidate object has changed.

4. The method of claim 2, wherein the step of determining if the reference count associated with the candidate object has changed further comprises the step of determining, after a time period, if the reference count associated with the candidate object has changed.

5. The method of claim 4, wherein:
    the step of determining, after a time period, if the candidate objects are still potentially garbage further comprises the step of for each candidate object, initializing a cyclic reference count based on a reference count associated with the object; and
    the step of determining, after a second time period, if the reference count associated with the candidate object has changed further comprises the step of determining, for each candidate object if the cyclic reference count is zero.

6. The method of claim 5, wherein:
    the step of finding candidate objects for garbage collection comprises the steps of:
    determining root objects by determining objects whose reference count has been decremented to a non-zero value;
    for each root object, determining objects in a cycle defined by the root object;
    storing references to each object in a cycle, thereby storing each cycle; and
    the step of determining, after a second time period, if the reference count associated with the candidate object has changed further comprises the step of processing the cycles in reverse order of an order in which they were stored.

7. The method of claim 4, wherein the time period is an epoch.

8. The method of claim 2, wherein each candidate object is part of a cycle and wherein the step of determining, after a time period, if the candidate objects are still potentially garbage comprises the steps of:
    for each candidate object, copying a reference count associated with the object into a cyclic reference count;
    for each candidate object, decrementing the cyclic reference count each time a reference from a referencing object refers to the candidate object, wherein the referencing object resides in the cycle in which the candidate object resides;
    waiting the time period; and
    for each candidate object, determining if the cyclic reference count associated with the candidate object is zero.

9. The method of claim 2, wherein:
    the step of identifying candidate objects for garbage collection further comprises the steps of:
    identifying a plurality of roots for garbage collection, wherein each root comprises a reference count and wherein each root describes a set comprising objects that are interconnected through references;
    selecting one of the sets;
    performing the following steps for the set:
        for each object in the set, creating a copy of the reference count; and
        for each object in the set, decrementing the copy of the reference count associated with the object for as many times as the object is referenced by itself or another object contained in the set;
    the step of determining further comprises:
        determining, after a time period, if the copies of the reference counts for each object in the set are zero;

determining if one or more increments have made at least one reference count for objects in the set outdated; and collecting the set as garbage when the copies for each object in the set are zero and when there are no outdated reference counts.

10. A computer system comprising:

a memory that stores computer-readable code; and a processor operatively coupled to the memory, the processor configured to implement the computer-readable code, the computer-readable code configured to:

determine increments and decrements of reference counts for a current time period;

process the increments of reference counts for the current time period;

store the decrements of reference counts for the current time period; and process decrements of reference counts for a previous time period, wherein each of the current and previous time periods are an epoch, wherein each epoch is separated by a period where increments and decrements to reference counts are applied for all processors in a plurality of processors, and wherein one or more of said steps are performed by one or more hardware devices.

11. The computer system of claim 10, further comprising the steps of:

identifying candidate objects having associated reference counts for garbage collection, wherein each candidate object is potentially garbage; and determining if the candidate objects are garbage, the step of determining performed without preventing mutators in the system from changing object references and the step of determining further comprising the steps of:

determining, after a time period, if the candidate objects are still potentially garbage; and for those candidate objects that are still potentially garbage, determining if the reference count associated with the candidate object has changed, wherein one or more of said steps are performed by one or more hardware devices.

12. The computer system of claim 11, wherein:

wherein each candidate object is potentially garbage;

the step of determining if the candidate objects are garbage further comprises the steps of:

determining, after a time period, if the candidate objects are still potentially garbage; and for those candidate objects that are still potentially garbage, determining if the reference count associated with the candidate object has changed.

13. The computer system of claim 11, wherein the step of determining if the reference count associated with the candidate object has changed further comprises the step of determining, after a time period, if the reference count associated with the candidate object has changed.

14. The computer system of claim 13, wherein:

the step of determining, after a time period, if the candidate objects are still potentially garbage further comprises the step of for each candidate object, initializing a cyclic reference count based on a reference count associated with the object; and the step of determining, after a second time period, if the reference count associated with the candidate object has changed further comprises the step of determining, for each candidate object if the cyclic reference count is zero.

15. The computer system of claim 14, wherein:

the step of finding candidate objects for garbage collection comprises the steps of:

determining root objects by determining objects whose reference count has been decremented to a non-zero value;

for each root object, determining objects in a cycle defined by the root object;

storing references to each object in a cycle, thereby storing each cycle; and the step of determining, after a second time period, if the reference count associated with the candidate object has changed further comprises the step of processing the cycles in reverse order of an order in which they were stored.

16. The computer system of claim 13, wherein the time period is an epoch.

17. The computer system of claim 11, wherein each candidate object is part of a cycle and wherein the step of determining, after a time period, if the candidate objects are still potentially garbage comprises the steps of:

for each candidate object, copying a reference count associated with the object into a cyclic reference count;

for each candidate object, decrementing the cyclic reference count each time a reference from a referencing object refers to the candidate object, wherein the referencing object resides in the cycle in which the candidate object resides;

waiting the time period; and for each candidate object, determining if the cyclic reference count associated with the candidate object is zero.

18. The computer system of claim 11, wherein:

the step of identifying candidate objects for garbage collection further comprises the steps of:

identifying a plurality of roots for garbage collection, wherein each root comprises a reference count and wherein each root describes a set comprising objects that are interconnected through references;

selecting one of the sets;

performing the following steps for the set:

for each object in the set, creating a copy of the reference count; and for each object in the set, decrementing the copy of the reference count associated with the object for as many times as the object is referenced by itself or another object contained in the set;

the step of determining further comprises:

determining, after a time period, if the copies of the reference counts for each object in the set are zero;

determining if one or more increments have made at least one reference count for objects in the set outdated; and collecting the set as garbage when the copies for each object in the set are zero and when there are no outdated reference counts.

19. An article of manufacture comprising:

a tangible computer-readable recordable storage medium having computer-readable program code means embodied thereon, the computer-readable program code means comprising:

means for determining increments and decrements of reference counts for a current time period;

means for processing the increments of reference counts for the current time period;

means for storing the decrements of reference counts for the current time period; and means for processing decrements of reference counts for a previous time period, wherein each of the current and previous time periods are an epoch, wherein each epoch is separated by a period where increments and decrements to reference counts are applied for all processors in a plurality of processors, and wherein one or more of said steps are performed by one or more hardware devices.

* * * * *